United States Patent
Lu et al.

(10) Patent No.: US 8,856,381 B2
(45) Date of Patent: Oct. 7, 2014

(54) METHOD FOR BINDING WORK LABEL SWITCHING PATH AND PROTECTION LABEL SWITCHING PATH

(75) Inventors: Chaogang Lu, Shenzhen (CN); Wei Fu, Shenzhen (CN); Xingyue Quan, Shenzhen (CN); Xiaodong Li, Shenzhen (CN); Jianfei He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1157 days.

(21) Appl. No.: 10/593,314

(22) PCT Filed: Feb. 6, 2006

(86) PCT No.: PCT/CN2006/000204
§ 371 (c)(1),
(2), (4) Date: Apr. 17, 2007

(87) PCT Pub. No.: WO2006/081775
PCT Pub. Date: Aug. 10, 2006

(65) Prior Publication Data
US 2008/0046589 A1     Feb. 21, 2008

(30) Foreign Application Priority Data

Feb. 6, 2005 (CN) .......................... 2005 1 0007332

(51) Int. Cl.
G06F 15/16 (2006.01)
G06F 15/173 (2006.01)
H04L 12/28 (2006.01)
H04L 12/66 (2006.01)
H04L 12/703 (2013.01)
H04L 12/723 (2013.01)
H04L 12/701 (2013.01)

(52) U.S. Cl.
CPC ................ *H04L 45/50* (2013.01); *H04L 45/28* (2013.01); *H04L 45/00* (2013.01)
USPC ........... 709/239; 709/227; 709/237; 709/238; 370/351; 370/355; 370/356

(58) Field of Classification Search
USPC .......... 709/227, 237, 238; 370/715, 725, 392, 370/235
See application file for complete search history.

(56) References Cited

U.S. PATENT DOCUMENTS

2002/0116669 A1*  8/2002  Jain ................................. 714/43
2004/0004955 A1*  1/2004  Lewis ........................... 370/351

(Continued)

FOREIGN PATENT DOCUMENTS

CN         1394053 A      1/2003
KR      2002032937 A      5/2002

(Continued)

OTHER PUBLICATIONS

Owens et al.: "A Path Protection/Restoration Mechanism for MPLS networks" [oneline], Jun. 2000 KETF XP002431506, retrieved from the Internet: URL:http://tools.ietf.org/id/draft-chang-mpls-path-protection-03.txt> [retrieved on Apr. 26, 2007] paragraphs 5.1, 5.1.1, and 5.1.2.

(Continued)

*Primary Examiner* — Ranodhi Serrao
*Assistant Examiner* — Farrukh Hussain
(74) *Attorney, Agent, or Firm* — Conley Rose, P.C.; Grant Rodolph

(57) ABSTRACT

A method for binding a work Label Switch Path (LSP) with a protection LSP, including: transmitting a first message including binding information to a Path Merging Label Switching Router (PML) via a Path Switching Label Switching Router (PSL) so as to request for creating a protection LSP of the work LSP; the PML router assigning a label for the protection LSP based on the first message and returning a second message carrying the binding information; after receiving the second message, the PSL router binding the work LSP with the protection LSP based on the binding information, and transmitting a notification message including the binding information to the PML router; the PML router binding the work LSP with the protection LSP based on the binding information in the notification message.

19 Claims, 9 Drawing Sheets

(56) References Cited

U.S. PATENT DOCUMENTS

2004/0114595 A1    6/2004  Doukai
2004/0240442 A1*  12/2004  Grimminger et al. ........ 370/389
2005/0198375 A1*   9/2005  Hwang et al. ................ 709/238
2006/0268853 A1*  11/2006  Guichard et al. ............. 370/389

FOREIGN PATENT DOCUMENTS

KR    2002096752 A    12/2002
KR    2003001635 A     1/2003
WO    WO 01/29682      4/2001

OTHER PUBLICATIONS

Foreign Communication from a Related Counterpart Application—International Search Report PCT/CN2006/000204, May 18, 2006, 3 pages.

Foreign Communication from a Related Counterpart Application—International Preliminary Report on Patentability PCT/CN2006/000204, Aug. 7, 2007, 5 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0| Label Request (0x0401)  |    Message Length             |
+-+-+-+-+-+-+-+-+-+-+-+-+-+-+-+-+-+-+-+-+-+-+-+-+-+-+-+-+-+-+-+-+
|            Message ID                     |
+-+-+-+-+-+-+-+-+-+-+-+-+-+-+-+-+-+-+-+-+-+-+-+-+-+-+-+-+-+-+-+-+
|         FEC TLV                           |
+-+-+-+-+-+-+-+-+-+-+-+-+-+-+-+-+-+-+-+-+-+-+-+-+-+-+-+-+-+-+-+-+
|         LSPID TLV     (CR-LDP, mandatory) |
+-+-+-+-+-+-+-+-+-+-+-+-+-+-+-+-+-+-+-+-+-+-+-+-+-+-+-+-+-+-+-+-+
|         ER-TLV       (CR-LDP, optional)   |
+-+-+-+-+-+-+-+-+-+-+-+-+-+-+-+-+-+-+-+-+-+-+-+-+-+-+-+-+-+-+-+-+
|         Traffic  TLV  (CR-LDP, optional)  |
+-+-+-+-+-+-+-+-+-+-+-+-+-+-+-+-+-+-+-+-+-+-+-+-+-+-+-+-+-+-+-+-+
|         Pinning TLV   (CR-LDP, optional)  |
+-+-+-+-+-+-+-+-+-+-+-+-+-+-+-+-+-+-+-+-+-+-+-+-+-+-+-+-+-+-+-+-+
|         Resource Class TLV (CR-LDP, optional) |
+-+-+-+-+-+-+-+-+-+-+-+-+-+-+-+-+-+-+-+-+-+-+-+-+-+-+-+-+-+-+-+-+
|         Preemption TLV (CR-LDP, optional) |
+-+-+-+-+-+-+-+-+-+-+-+-+-+-+-+-+-+-+-+-+-+-+-+-+-+-+-+-+-+-+-+-+
|         BIND TLV                          |
+-+-+-+-+-+-+-+-+-+-+-+-+-+-+-+-+-+-+-+-+-+-+-+-+-+-+-+-+-+-+-+-+
```

Figure 4B

```
      0           1           2           3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |0|  Notification ( 0x0001 )     |       Message Length          |
   +-+-+-+-+-+-+-+-+-+-+-+-+-+-+-+-+-+-+-+-+-+-+-+-+-+-+-+-+-+-+-+-+
   |              Message ID                                        |
   +-+-+-+-+-+-+-+-+-+-+-+-+-+-+-+-+-+-+-+-+-+-+-+-+-+-+-+-+-+-+-+-+
   |              Status ( TLV )                                    |
   +-+-+-+-+-+-+-+-+-+-+-+-+-+-+-+-+-+-+-+-+-+-+-+-+-+-+-+-+-+-+-+-+
   |              LSPID TLV                                         |
   +-+-+-+-+-+-+-+-+-+-+-+-+-+-+-+-+-+-+-+-+-+-+-+-+-+-+-+-+-+-+-+-+
   |              BIND TLV                                          |
   +-+-+-+-+-+-+-+-+-+-+-+-+-+-+-+-+-+-+-+-+-+-+-+-+-+-+-+-+-+-+-+-+
   |              Optional Parameters                               |
   +-+-+-+-+-+-+-+-+-+-+-+-+-+-+-+-+-+-+-+-+-+-+-+-+-+-+-+-+-+-+-+-+
```

Figure 4C

METHOD FOR BINDING WORK LABEL SWITCHING PATH AND PROTECTION LABEL SWITCHING PATH

CROSS-REFERENCE TO RELATED APPLICATIONS

This is a national stage of International Application No. PCT/CN2006/000204, filed on Feb. 6, 2006, which claims priority of Chinese Patent Application No. 200510007332.3, filed Feb. 6, 2005, the disclosure of each application is hereby incorporated by reference in their entirety.

FIELD OF THE TECHNOLOGY

The present invention relates to the label switching technique of the communication field, and particularly, to a method for binding work label switching path with protection label switching path.

BACKGROUND OF THE INVENTION

Multiprotocol Label Switching (MPLS), in which the protection is based on the protection label switching path (LSP) set up in advance, has become a data transport technique gradually.

A 1:1 and 1+1 modes of protection for MPLS are put forward in Y.1720 standard by International Telecommunications Union—Telecommunication Standardization Sector (ITU-T). The 1+1 protection means that there are a work LSP and a protection LSP between a source node and a destination node. The source node transmits data via the work LSP and the protection LSP simultaneously. In normal conditions, the destination node receives the data from the work LSP. If there is a failure in the work LSP, the destination node receives data from the protection LSP. The 1:1 protection of the MPLS means that there are a work LSP, a protection LSP and a return LSP between a source node and a destination node. In normal conditions, the source node transmits the data via the work LSP and the destination node receives the data from the work LSP. If there is a failure in the work LSP, the destination node notifies the source node via the return LSP so as to switch the data to the protection LSP, and the destination node receives the data from the protection LSP.

In the source node and the destination node, it is needed to bind the work LSP with the protection LSP, or to bind the work LSP, the protection LSP and the return LSP, that is to say, to make it able to find the other one or two LSPs based on one of these LSPs. In the prior art, the work LSP, the protection LSP and the return LSP are usually configured statically and bound together, including the steps of (take the 1:1 protection of the MPLS as an example):

1. configuring the ingress including name, destination address and mask code, address of the next hop or egress interface and exit label of the static LSP;

2. configuring the intermediate node, including name, ingress interface, address of the next hop or egress interface, entrance label and exit label of the static LSP;

3. configuring the egress, including name, ingress interface and entrance label of the static LSP;

4. configuring the work LSP, the protection LSP and the return LSP, respectively, then associating the names of the three LSPs to implement the binding.

At present, the MPLS technique has gradually become general MPLS (GMPLS) by further upgrading and could be used in various networks, such as Ethernet and etc. For instance, the concept of the LSP is also applicable to new Ethernet, the establishment and maintenance thereof is implemented by the existing method of the MPLS technique. Therefore, it is necessary to make the work LSP with the protection LSP binding by static configuration more easily, and decrease the burden of maintainers, so to make convenient for users to cutover services and upgrade the network, and also make service management easy.

SUMMARY OF THE INVENTION

A method for binding work Label Switching Path (LSP) with protection LSP, so as to solve the problems of difficult operation and tough management of services resulted from binding the work LSP and the protection LSP statically in the prior art.

A method for binding work LSP and protection LSP is provided in the present invention, including the steps of:

a Path Switching Label Switching Router (PSL) transmits a first message including binding information to a Path Merging Label Switching Router (PML) to request for creating the protection LSP of the work LSP;

the PML router assigns a label for the protection LSP based on the first message, and returns a second message including the binding information;

upon receiving the second message, the PSL router binds the work LSP with the protection LSP according to the binding information, and transmits a notification message including the binding information to the PML switched router;

the PML router binds the work LSP with the protection LSP according to the binding information in the notification message.

To sum up, by the method for binding the work LSP with the protection LSP provided by this invention, the binding of the work LSP with the protection LSP is implemented via signaling transporting in the process of creating the work LSP and the return LSP. As a result, static configuration is no longer needed, the 1:1 and 1+1 protection configurations of the MPLS become simple and service management turns easy.

BRIEF DESCRIPTION OF THE DRAWINGS

FIG. 4B is a schematic diagram illustrating the coding of the label mapping message of the protocol after extending LDP or CR-LDP protocols;

FIG. 4C a schematic diagram illustrating the coding of the notification message of the protocol after extending LDP or CR-LDP protocols;

EMBODIMENTS OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In accordance with the method for binding the work LSP with the protection LSP provided by an embodiment in accordance with the present invention, the binding of the work LSP with the protection LSP is implemented via signaling transporting in the process of creating the work LSP.

The embodiment of the present invention improves the existing method for binding the work LSP with the protection LSP. In another word, the embodiment of the present invention further improves the label switching technique itself, thus no modification is needed on an actual network that employs this label switching technique when this method is used in the actual network.

Therefore, the method for binding the work LSP with the protection LSP is applicable to networks which adopt the label switching technique of the MPLS or GMPLS concept, including but not limited to Ethernet, MPLS, and etc.

Figure 1:
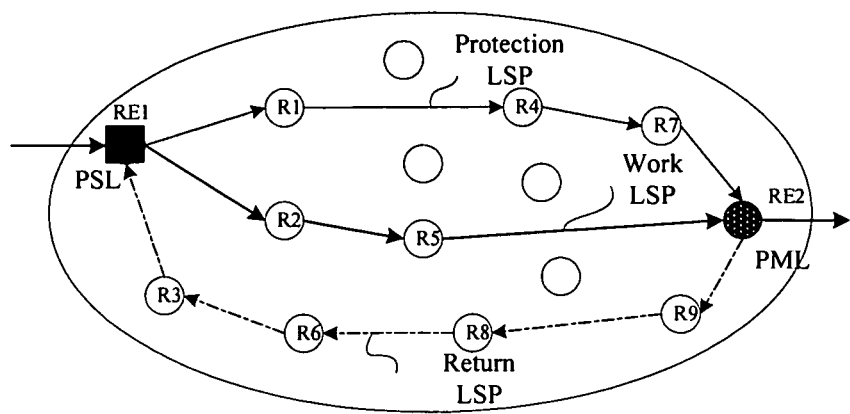
FIG. 1 is a schematic diagram illustrating a work LSP, a protection LSP and a return LSP created.

Refer to FIG. 1, which is a schematic diagram illustrating the work LSP, protection LSP and return LSP created. In this Figure, there is a work LSP between Label Edge Routers (LER) RE1 and RE2, i.e., a common LSP: RE1→R2→R5→RE2. If the 1+1 protection mode of the MPLS is adopted, it is necessary to create a protection LSP between LERs RE1 and RE2, that is: RE1→R1→R4→R7→RE2; if the 1:1 protection mode of the MPLS is adopted, it is also necessary to create a return LSP between LERs RE1 and RE2, that is: RE2→R9→R8→R6→R3→RE1. Herein, LER RE1 is used as the PSL router while LER RE2 is used as the PML switched router.

The method for creating an LSP is the same as in the prior art, using the RSVP, the LDP or the CR-LDP.

In the process of creating the protection LSP and the return LSP, the embodiment of the present invention implements the binding of the work LSP with the protection LSP (in the 1+1 protection mode), or the binding of the work LSP, the protection LSP and the return LSP (in the 1:1 protection mode) via the signaling including the binding information.

Figure 2:
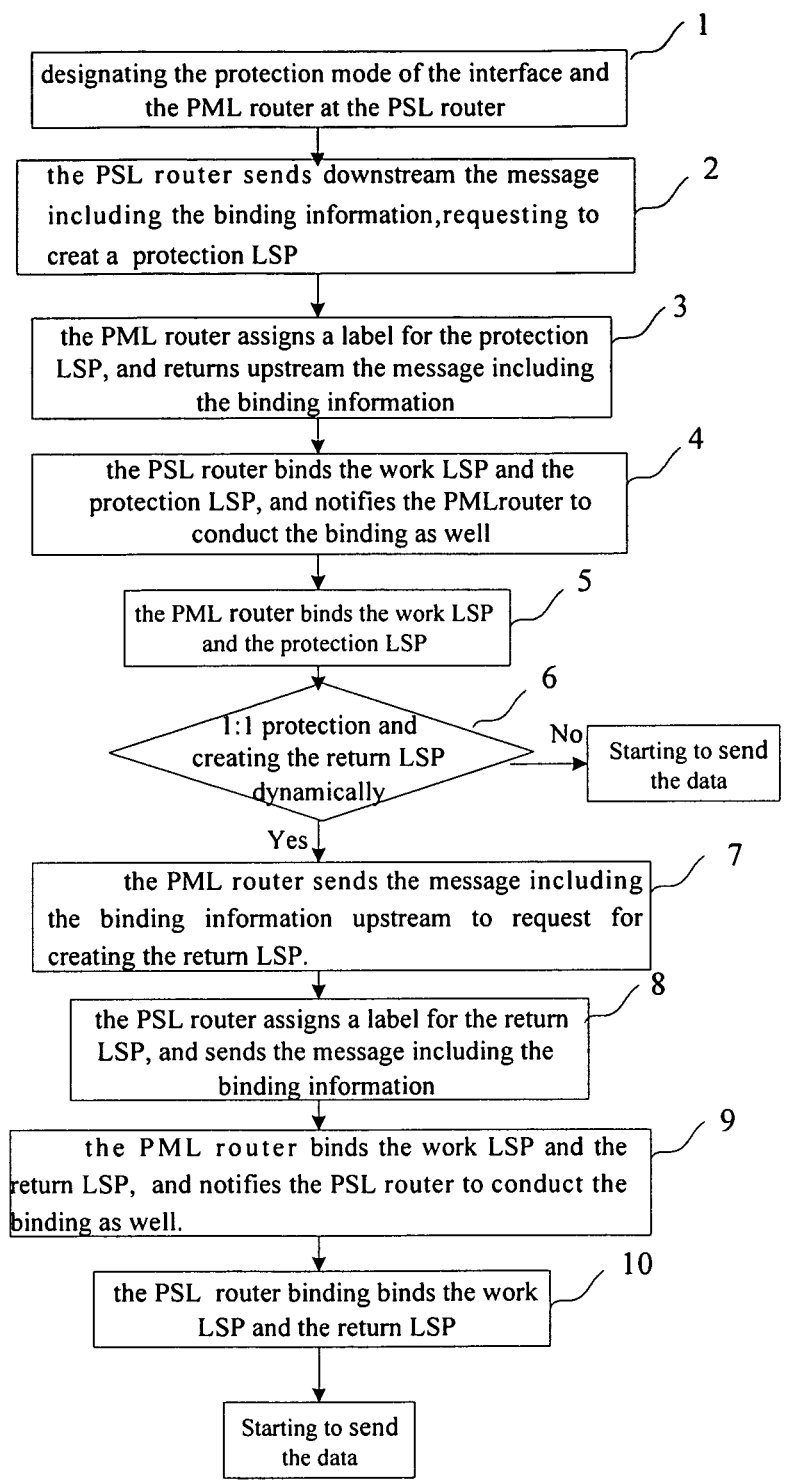
FIG. 2 is a flow chart of implementing the binding of a work LSP, a protection LSP and a return LSP.

Refer to FIG. 2, which is a flow chart of implementing the binding of the work LSP, the protection LSP and the return LSP, and the process of the implementation includes:

Step 1: designating the protection mode of the interface and the PML router on the PSL router of the work LSP. Alternatively, this step may include determining the protection mode (1:1 or 1+1) of the LSP or the interface and the PML router node, by means of signaling negotiation based on the establishment of the LSP.

In FIG. 1, the PML router is LER RE2 while the protection mode is 1:1 or 1+1.

Since the present 1+1 and 1:1 protections are both end to end, i.e., from an ingress to an egress, the PSL router is the ingress. According to the need of the protection mode, the work LSP may be created first, and then be designated as the LSP needing protection, thus the corresponding PML router is the egress of the LSP. Alternatively, the protection mode and the PML router may be designated on the PSL router before creating the work LSP, the protection LSP and the return LSP.

Step 2: the PSL router transmits downstream along the route of the protection LSP, i.e., from RE1 to RE2, the first message including the binding information, requesting for creating a protection LSP between the PSL router and the PML router for the work LSP.

If the LSP is created via the RSVP, then in this step, the first message including the binding information is the path message; if the LSP is created via the LDP or the CR-LDP, the first message including the binding information is the label request message.

If the protection mode is 1+1, the binding information includes: identifier of the work LSP, type of the LSP and the protection mode; if the protection mode is 1:1, the binding information further includes the selection mode of the return LSP in the 1:1 protection mode.

Step 3: upon receiving the path message or the label request message including the binding information, the PML router assigns a label for the protection LSP, and returns upstream a resv message (corresponding to the path message) or a label mapping message (corresponding to the label request message) including the binding information.

Step 4: upon receiving the resv message (corresponding to the path message) or the label mapping message (corresponding to the label request message) including the binding information, the PSL router finishes the establishment of the protection LSP, binds at the same time the work LSP with the protection LSP, and notifies the PML router so that the PML router could conduct the binding as well, the notification message including the binding information.

Step 5: upon receiving the notification message including the binding information, the PML router binds the work LSP with the protection LSP.

Step 6: after binding the work LSP with the protection LSP, if the PML router determines the protection mode as 1:1 and chooses to create the return LSP dynamically via signaling, proceed to Step 7, otherwise start to transmit the data.

Step 7: the PML router transmits the path or the label request message including the binding information upstream to request for creating the return LSP.

Step 8: upon receiving the path or the label request message, the PSL router assigns a label for the return LSP, and transmits downstream a resv message (corresponding with the path message) or a label mapping message (corresponding with the label request message) including the binding information.

Step 9: upon receiving the resv message or the label mapping message, the PML router finishes the establishment of the return LSP, binds the work LSP with the return LSP and notifies the PSL router so that the PSL router could bind the work LSP with the return LSP.

Step 10: upon receiving the notification message of binding, the PSL router binds the work LSP with the return LSP, and may thereafter transmit the data.

The foregoing process of binding of the work LSP with the protection LSP could be realized by extending an object or Type Length Value (TLV) in the protocol, and the binding realized by extended protocols is hereinafter described, respectively:

1. RSVP Extending (1) Extending an Label Switching Path Bind (LSP_BIND) Object

Extend an LSP_BIND Object in the RSVP (refer to rfc2205 and rfc2210), and the object includes the following fields:

Tunnel ID, the same as the tunnel id of SESSION Object;
LSP ID, the same as the LSP ID of SENDER_TEMPLATE Object;

Binded Tunnel ID, denoting the bound tunnel;

Binded LSP ID, denoting the bound LSP;

Category, denoting the type of the LSP, identifying the work LSP, the protection LSP and the return LSP of the 1:1 mode, respectively;

Rtn, denoting the selection mode of the return LSP, meaningful only in the 1:1 protection mode.

(2) Extending the Path Message

Upon extending an LSP_BIND object, the path message become: (refer to rfc2205, rfc2210)

```
<Path Message>::= <Common Header>[<INTEGRITY>]
<SESSION><RSVP_HOP>
<TIME_VALUES>
[<POLICY_DATA>...]
[<sender descriptor>]
<sendter descriptor>   ::=   <SENDER_TEMPLATE>
<SENDER_TSPEC><LSP_BIND>
   [<ADSPEC>]
```

(3) Extending the Resv Message

The format of the Resv message after being extended is as follows:

```
<Resv Message>::= <Common Header>[<INTEGRITY>]
<SESSION> <RSVP_HOP>
<TIME_VALUES>
[<RESV_CONFIRM>] [<SCOPE>]
[<POLICY_DATA>...]
<STYLE> <flow descriptor list>
<flow descriptor list> ::= <empty> |
<flow descriptor list> <flow descriptor><LSP_BIND
```

(4) Extending the ResvConf Message

The format of the ResvConf message after being extended is:

```
<ResvConf message>::= <Common Header> [<INTEGRITY>]
<SESSION><ERROR_SPEC>
<RESV_CONFIRM>
<STYLE> <flow descriptor list>
<flow descriptor list> ::= <empty> |
<flow descriptor list> <flow descriptor><LSP_BIND>
```

(5) Processing of the Nodes

Figure 3A:
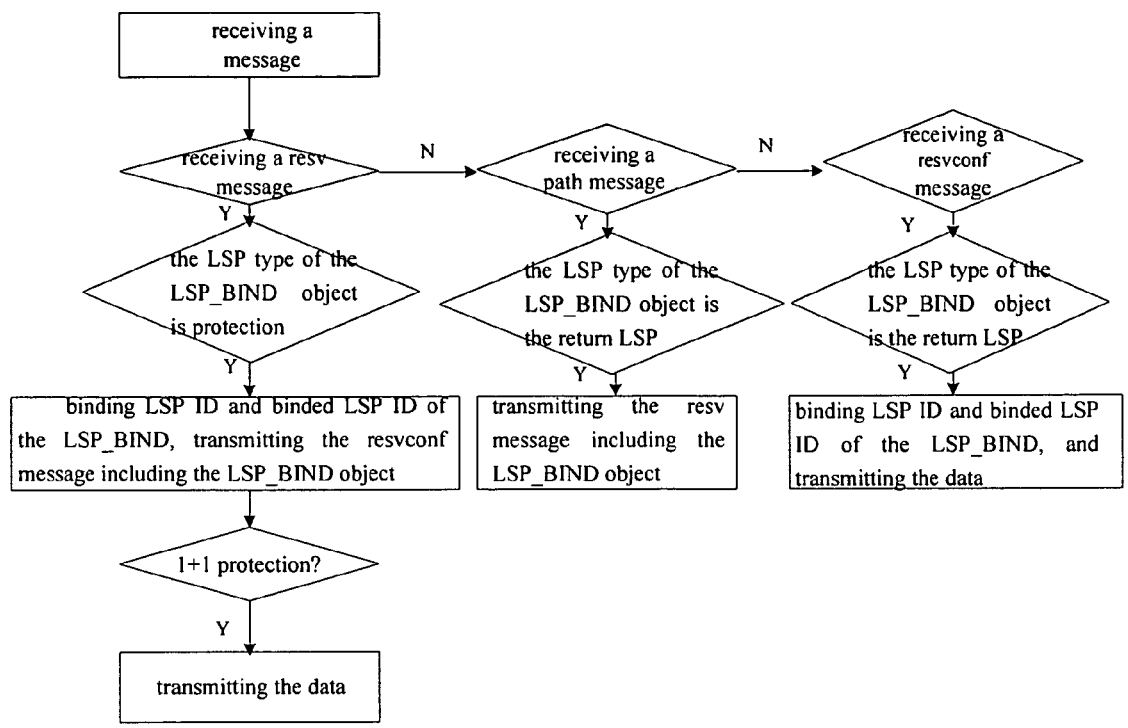
FIG. 3A is a flow chart of Path Switching Label (PSL) switched router node processing messages when Resource Reservation Protocol (RSVP) is used.

The processing of the PSL router is shown in FIG. 3A: after the PSL router fills an LSP_BIND object according to the protection mode and transmits the path message for creating the protection LSP, if the PSL router receives a resv message and the LSP type of the LSP_BIND object of the message is protection, the PSL router will bind the LSP ID with bound LSP ID in the LSP_BIND, and transmit to the PML router a resvconf message including the LSP_BIND object; if the PSL router receives a path message and the LSP type of the LSP_BIND object in the message is the return LSP, the PSL router will transmit to the PML router a resv message including the LSP_BIND object; if the PSL router receives a resvconf message and the LSP type of the LSP_BIND object in the message is the return LSP, the PSL router will bind the LSP ID with bound LSP ID of the LSP_BIND, and then start to transmit the data.

Figure 3B:
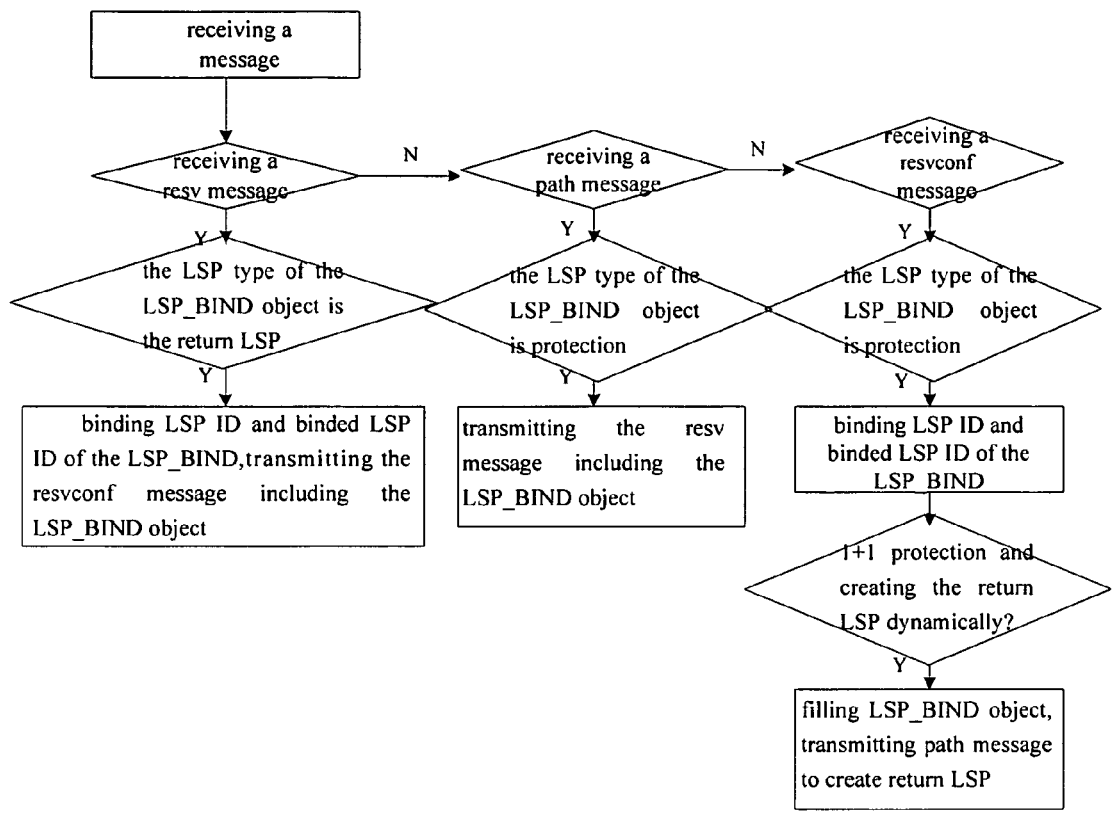
FIG. 3B is a flow chart of Path Merging Label (PML) switched router node processing messages when RSVP is used.

The processing of the PML router is as shown in FIG. 3B: if the PML router receives a resv message and the LSP type of the LSP_BIND object in the message is Return, the PML router will bind the LSP ID with bound LSP ID of the LSP_BIND, and transmit to the PSL router a resvconf message including the LSP_BIND object; if the PML router receives a path message and the LSP type of the LSP_BIND object in the message is Protection, the PML router will transmit to the PSL router a resv message including the LSP_BIND object; if the PML router receives a resvconf message and the LSP type of the LSP_BIND object in the message is Protection, the PML router will bind the LSP ID with bound LSP ID of the LSP_BIND, if it is the 1:1 protection and the return LSP is created dynamically, fill the LSP_BIND object and transmit to PSL router a path message for creating the return LSP.

2. LDP or CR-LDP Extending (1) BIND TLV

Extend a BIND TLV (refer to rfc3036, rfc3212), including the following fields:

LSPID TLV: denoting the protected work LSP ID;

Category: denoting type of the LSP, identifying the work LSP, the protection LSP or the return LSP of the 1:1 mode;

Rtn: denoting the selection mode of the return LSP, meaningful only in the 1:1 protection.

(2) Label Request Message and Label Mapping Message

Figure 4A:
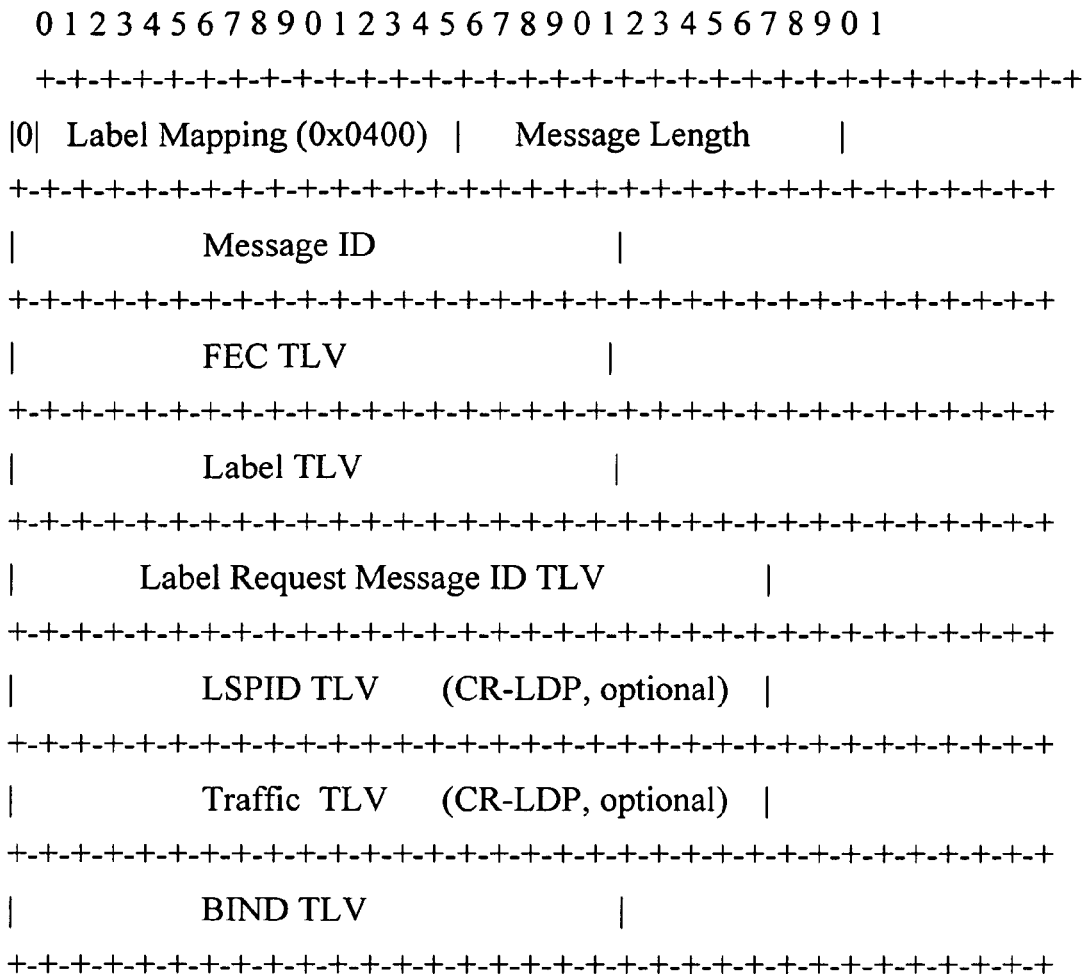
FIG. 4A a schematic diagram illustrating the coding of the label request message of the protocol after extending label distribution protocol (LDP) or constraint route-label distribution protocol (CR-LDP) protocols.

After extending a BIND TLV, both the Label request message and the Label mapping message need to be incorporated with the BIND TLV, of which the formats are shown in FIG. 4A and FIG. 4B, respectively (3) Notification Message Upon creating the protection LSP of the PSL router or the return LSP of the PML switched router, notify the opposite side of the binding via a notification message. The format of the notification message is shown in FIG. 4C:

(4) Processing of the Nodes

Figure 5A:
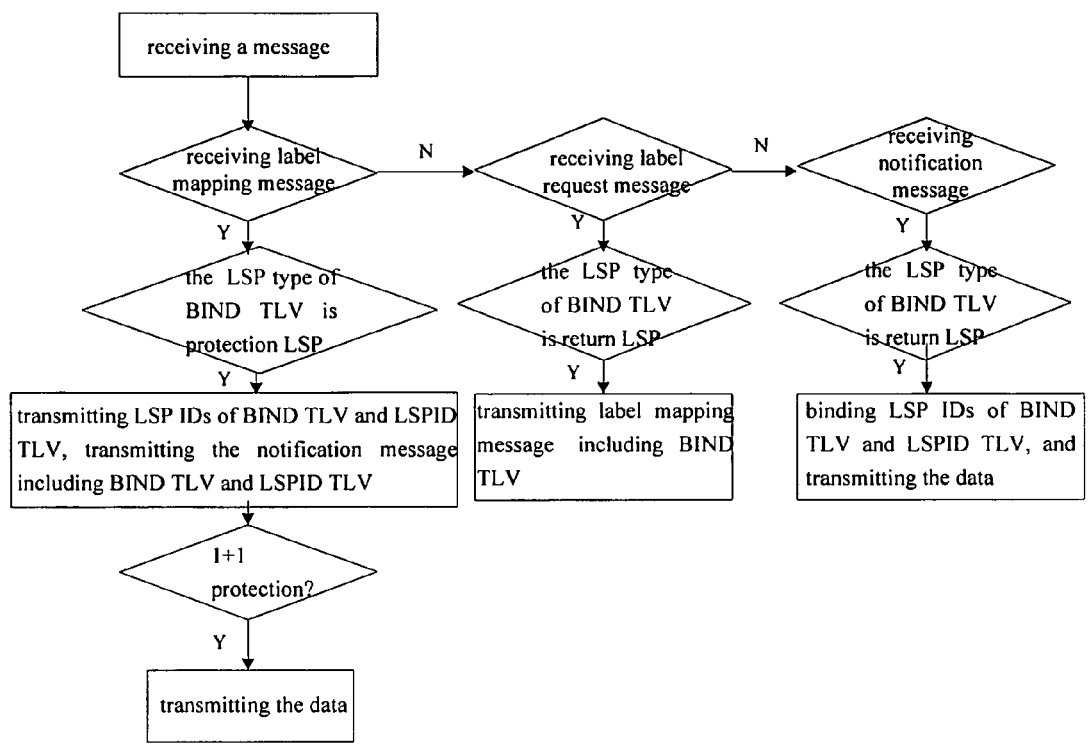
FIG. 5A is a flow chart of PSL router node processing messages when LDP or CR-LDP is used.

The processing of the PSL router is shown in FIG. 5A: after the PSL router fills a BIND TLV object according to the protection mode and transmits a label request message for creating the protection LSP, if the PSL router receives a label mapping message and the LSP type of the BIND TLV in the message is protection, the PSL router will bind the LSP IDs in the BIND TLV and the LSPID TLV, and transmit to the PML router a notification message including the BIND TLV and the LSPID TLV, and if it is the 1+1 protection, transmit the data; if the PSL router receives a label request message and the LSP type of the BIND TLV is return, the PSL router will transmit to the PML router a label mapping message including the BIND TLV; if the PSL router receives a notification message and the LSP type of the BIND TLV is the return LSP, the PSL router will bind the LSP IDs in the BIND TLV and the LSPID TLV, and transmit the data.

Figure 5B:
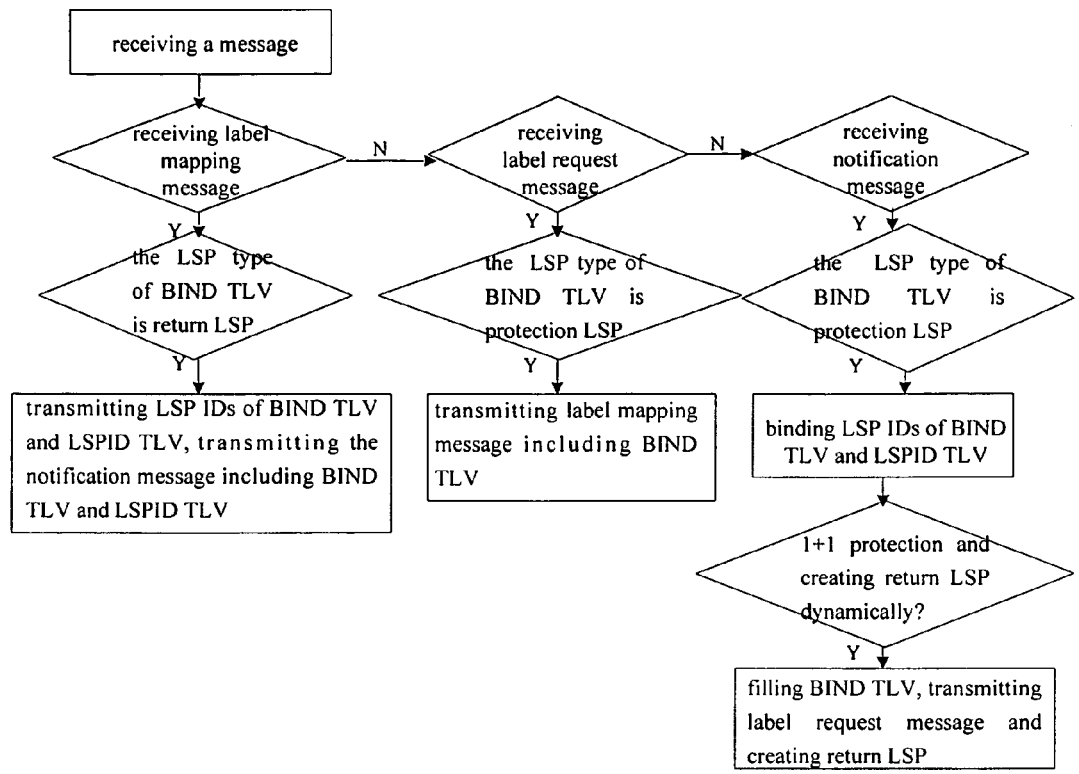
FIG. 5B a flow chart of PML router node processing messages when LDP or CR-LDP is used.

The processing of the PML router is shown in FIG. 5B: if the PML router receives a label mapping message and the LSP type of the BIND TLV is the return LSP, the PML router will bind the LSP IDs of the BIND TLV and LSPID TLV, and transmit to the PSL router a notification message including the BIND TLV and the LSPID TLV; if the PML router receives a label request message and the LSP type of the BIND TLV is protection, the PML router will transmit to the PSL router a label mapping message including the BIND TLV; if the PML router receives a notification message and the LSP type of the BIND TLV is protection, the PML router will bind the LSP IDs of the BIND TLV and LSPID TLV, if it is the 1:1 protection and the return LSP is created dynamically, the PML router will further fill the BIND TLV and transmit to the PSL router a label request message for creating the return LSP.

If there are multiple work LSP sections on one LSP which need to be protected, each work LSP section is bound based on the foregoing method, respectively.

Although preferred embodiments are disclosed herein, many variations are possible which remain within the concept, scope, and spirit of the invention, and these variations would become clear to those skilled in the art after perusal of this application.

The invention claimed is:

1. A method for binding a work label switching path (LSP) with a protection LSP, comprising:

a Path Switching Label Switching Router (PSL) transmitting a first message which comprises a binding information to a Path Merging Label Switching Router (PML) to request for creating the protection LSP of the work LSP;

the PML router assigning a label for the protection LSP based on the first message, and returning a second message which comprises the binding information;

upon receiving the second message, the PSL router binding the work LSP with the protection LSP according to the binding information, and transmitting a notification message which comprises the binding information to the PML switched router; and the PML router binding the work LSP with the protection LSP according to the binding information in the notification message, wherein the binding information comprises an identifier of the work LSP, a type of the LSP, and a protection mode, and wherein the PSL and PML are label edge routers.

2. The method according to claim 1, further comprising: before creating the work LSP, designating the PML router and the protection mode of the work LSPs at the PSL switched router; or, after creating the work LSP, designating the PML router and the protection mode of the work LSPs at the PSL switched router.

3. The method according to claim 2, if the protection mode for the work LSPs is 1+1 mode, the binding information comprises the work LSP identifier, LSP type, and the protection mode; if the protection mode for the work LSPs is 1:1, the binding information comprises the work LSP identifier, LSP type, the protection mode and selection mode of the return LSP in the 1:1 protection mode.

4. The method according to claim 3, after the PMI, router receives the notification message, if it is determined that the protection is in the 1:1 mode and it is chosen to create the return LSP dynamically via signaling, further comprising:

the PML router transmitting to the PSL router a third message of requesting for creating the return LSP, with the binding information included in the third message;

the PSL router assigning a label for the return LSP according to the third message, and returning a fourth message which comprises the binding information;

the PML router binding the work LSP and the return LSP based on the binding information of the fourth message, and transmitting to the PSL router a notification message which comprises the binding information; the PSL router binding the work LSP and the return LSP based on the binding information of the notification message.

5. The method according to claim 4, wherein, if the RSVP is used to create the LSP, the first message and the third message are path messages in the RSVP, and the second message and the fourth message are Resv messages in the RSVP, and the notification message is ResvConf message in the RSVP.

6. The method according to claim 5, further comprising: extending a binding object in the RSVP, and extending the Path message, Resv message and ResvConf message to comprise information of the binding object to implement the binding of the work LSP and the protection LSP.

7. The method according to claim 4, wherein, if the LDP or the CR-LDP is used to create the LSP, the first message and the third message are the Label Request messages of the LDP or CR-LDP, and the second message and the fourth message are the Label mapping messages of the LDP or the CR-LDP, and the notification message is a notification message in the LDP or the CR-LDP.

8. The method according to claim 7, further comprising: extending the binding the TLV in the LDP or the CR-LDP, and adding the binding TLV to the Label Request message, Label mapping message and notification message to implement the binding of the work LSP and the protection LSP.

9. The method according to claim 1, wherein data is transmitted via the work LSP and protection LSP simultaneously from PSL to PML, the PML receives the data from the work LSP in normal conditions, if there is a failure in the work LSP, the PML receives data from the protection LSP.

10. The method according to claim 1, wherein the binding occurs during creation of the protection LSP.

11. The method according to claim 10, wherein at least one node in the protection LSP is not part of the work LSP.

12. The method according to claim 11, wherein data is transmitted via the work LSP and protection LSP simultaneously from PSL to PML, the PML receives the data from the work LSP in normal conditions, if there is a failure in the work LSP, the PML receives data from the protection LSP.

13. The method according to claim 1, if the protection mode for the work LSPs is 1:1, the binding information comprises the work LSP identifier, LSP type, the protection mode and selection mode of the return LSP in the 1:1 protection mode, and wherein the PSL and PML are label edge routers.

14. The method according to claim 13, further comprising, after the PML router receives the notification message, if it is determined that the protection is in the 1:1 mode and it is chosen to create the return LSP dynamically via signaling:

the PML router transmitting to the PSL router a third message of requesting for creating the return LSP, with the binding information included in the third message;

the PSL router assigning a label for the return LSP according to the third message, and returning a fourth message which comprises the binding information;

the PML router binding the work LSP and the return LSP based on the binding information of the fourth message, and transmitting to the PSL router a notification message which comprises the binding information;

the PSL router binding the work LSP and the return LSP based on the binding information of the notification message.

15. The method according to claim 14, wherein, if Resource Reservation Protocol (RSVP) is used to create the LSP, the first message and the third message are path messages in the RSVP, and the second message and the fourth message are Resv messages in the RSVP, and the notification message is Reservation Configuration (ResvConf) message in the RSVP.

16. The method according to claim 15, further comprising: extending a binding object in the RSVP, and extending the Path message, Resv message and ResvConf message to comprise information of the binding object to implement the binding of the work LSP and the protection LSP.

17. The method according to claim 14, wherein, if label distribution protocol (LDP) or constraint route-label distribution protocol (CR-LDP) is used to create the LSP, the first message and the third message are the Label Request messages of the LDP or CR-LDP, and the second message and the fourth message are the Label mapping messages of the LDP or the CR-LDP, and the notification message is a notification message in the LDP or the CR-LDP.

18. The method according to claim 17, ftirther comprising: extending the binding Type Length Value (TLV) in the LDP or the CR-LDP, and adding the binding TLV to the Label Request message, Label mapping message and notification message to implement the binding of the work LSP and the protection LSP.

19. A method for binding a work label switching path (LSP) with a protection LSP, comprising:
- in the process of creating the protection LSP, a Path Switching Label Switching Router (PSL) transmitting a first message which comprises a binding information to a Path Merging Label Switching Router (PML) to request for creating the protection LSP of the work LSP;
- the PML router assigning a label for the protection LSP based on the first message, and returning a second message Which comprises the binding information;
- upon receiving the second message, the PSL router binding the work LSP with the protection LSP according to the binding information, and transmitting a notification message which comprises the binding information to the PML switched router; and
- the PML router binding the work LSP with the protection LSP according to the binding information in the notification message,
- if the protection mode for the work LSPs is 1+1 mode, the binding information comprises the work LSP identifier, LSP type, and the protection mode; and
- if the protection mode for the work LSPs is 1:1, the binding information comprises the work LSP identifier, LSP type, the protection mode and selection mode of the return LSP in the 1:1 protection mode.

* * * * *

UNITED STATES PATENT AND TRADEMARK OFFICE
CERTIFICATE OF CORRECTION

PATENT NO. : 8,856,381 B2  Page 1 of 2
APPLICATION NO. : 10/593314
DATED : October 7, 2014
INVENTOR(S) : Chaogang Lu et al.

It is certified that error appears in the above-identified patent and that said Letters Patent is hereby corrected as shown below:

In the Claims

Column 7, Lines 39-54, Claim 4 should read:

The method according to claim 3, after the PML router receives the notification message, if it is determined that the protection is in the 1:1 mode and it is chosen to create the return LSP dynamically via signaling, further comprising:
the PML router transmitting to the PSL router a third message of requesting for creating the return LSP, with the binding information included in the third message;
the PSL router assigning a label for the return LSP according to the third message, and returning a fourth message which comprises the binding information;
the PML router binding the work LSP and the return LSP based on the binding information of the fourth message, and transmitting to the PSL router a notification message which comprises the binding information;
the PSL router binding the work LSP and the return LSP based on the binding information of the notification message.

Column 9, Lines 1-6, Claim 18 should read:

The method according to claim 17, further comprising:
extending the binding the TLV in the LDP or the CR-LDP, and adding the binding TLV to the Label Request message, Label mapping message and notification message to implement the binding of the work LSP and the protection LSP.

Column 9, Line 7-31, Claim 19 should read:

A method for binding a work label switching path (LSP) with a protection LSP, comprising:
in the process of creating the protection LSP, a Path Switching Label Switching Router (PSL) transmitting a first message which comprises a binding information to a Path Merging Label Signed and Sealed this
Sixth Day of January, 2015

Michelle K. Lee
*Deputy Director of the United States Patent and Trademark Office*

Switching Router (PML) to request for creating the protection LSP of the work LSP;

the PML router assigning a label for the protection LSP based on the first message, and returning a second message which comprises the binding information;

upon receiving the second message, the PSL router binding the work LSP with the protection LSP according to the binding information, and transmitting a notification message which comprises the binding information to the PML switched router; and the PML router binding the work LSP with the protection LSP according to the binding information in the notification message, if the protection mode for the work LSPs is 1+1 mode, the binding information comprises the work LSP identifier, LSP type, and the protection mode; and if the protection mode for the work LSPs is 1:1, the binding information comprises the work LSP identifier, LSP type, the protection mode and selection mode of the return LSP in the 1:1 protection mode.